US005312503A

United States Patent [19]

Yuki

[11] Patent Number: 5,312,503

[45] Date of Patent: May 17, 1994

[54] LAMINATED MAGNETIC CORE AND METHOD OF MANUFACTURING SAME

[75] Inventor: Norio Yuki, Kanagawa, Japan

[73] Assignee: Nippon Mining Co., Ltd., Tokyo, Japan

[21] Appl. No.: 798,259

[22] Filed: Nov. 18, 1991

Related U.S. Application Data

[60] Continuation of Ser. No. 563,317, Jul. 26, 1990, abandoned, which is a division of Ser. No. 388,519, Aug. 2, 1989, Pat. No. 5,097,373.

[30] Foreign Application Priority Data

Aug. 4, 1988 [JP] Japan ............................... 63-193458

[51] Int. Cl.$^{5}$ ................................................ B32B 3/00

[52] U.S. Cl. .................................. 156/250; 29/602.1; 148/122; 156/155; 156/184; 360/120; 428/216

[58] Field of Search ....................... 29/602.1; 148/122; 156/155, 184, 250; 360/120; 428/216

[56] References Cited

U.S. PATENT DOCUMENTS

| | | | |
|---|---|---|---|
| 3,010,185 | 11/1961 | Hume | 29/155.58 |
| 3,614,830 | 10/1971 | Bate et al. | 29/603 |
| 3,666,588 | 5/1972 | Wanesky | 156/155 |
| 4,288,260 | 9/1981 | Senno | 252/862 |
| 4,488,195 | 12/1984 | Yanagiuchi et al. | 360/125 |
| 4,543,208 | 9/1985 | Horie et al. | 252/62.54 |
| 4,948,656 | 8/1990 | Schoeu | 428/215 |

FOREIGN PATENT DOCUMENTS

| | | |
|---|---|---|
| 1440968 | 6/1976 | United Kingdom . |
| 1440969 | 6/1976 | United Kingdom . |
| 1440970 | 6/1976 | United Kingdom . |

*Primary Examiner*—David A. Simmons
*Assistant Examiner*—Merrick Dixon
*Attorney, Agent, or Firm*—Wood, Phillips, VanSanten, Hoffman, & Ertel

[57] ABSTRACT

A laminated magnetic core is characterized in that core-forming thin sheets each having a surface roughness such that the maximum height Rmax is at least 1 μm are laminated together with a sheet-to-sheet distance of 2 to 10 μm, desirably 3 to 6 μm and that at least a part of protruded portions of the opposite roughed surfaces is diffusion-bonded to each other at the interface between adjacent thin sheets. The laminated magnetic core may have innumberable voids present at the diffusion-bonded interface between the adjacent thin sheets. This invention further provides a method of manufacturing a laminated magnetic core comprising the steps of providing a plurality of core-forming thin sheets each having a surface roughness such that the maximum height Rmax is at least 1 μm; laminating and bonding said core-forming thin sheets one upon another through an organic adhesive, desirably at a sheet-to-sheet distance of 2 to 10 μm; punching out a block of a given shape from said laminated and bonded core-forming sheets by a press; and thereafter magnetically annealing the block while decomposing and vaporizing said organic adhesive to effect diffusion-bonding at the interface between adjacent thin sheets of the block lefting innumberable voids at the interface.

5 Claims, 1 Drawing Sheet

LAMINATED MAGNETIC CORE AND METHOD OF MANUFACTURING SAME

This application is a continuation of application Ser. No. 563,317, filed Jul. 26, 1990, abandoned, which is a division of application Ser. No. 388,519, filed Aug. 2, 1989, now U.S. Pat. No. 5,097,373.

FIELD OF THE INVENTION

This invention relates to a laminated magnetic core for a magnetic head, a transformer, or the like and a method of manufacturing such core.

BACKGROUND OF THE INVENTION

Previously, magnetic cores for magnetic heads, transformers and other similar devices have been manufactured by punching or stamping core chips each having a given shape with a punching press from a thin sheet ( about 0.02 to 0.1 mm thick ) of Permalloy, silicon steel or the like, magnetically annealing the chips, and laminating a given number of the chips while bonding them together with an organic adheshive. The reason why a number of chips each of a thin sheet are laminated in this way was to reduce eddy current loss and to thereby ensure favorable high-frequency characteristics. Nevertheless, the conventional method has had the following shortcomings: (1) With Permalloy that has been magnetically annealed usually in hydrogen or a vacuum kept at 1000° to 1200° C. for 1 to 4 hours ), even a slight strain deteriorates its magnetic characteristics. The subsequent step of lamination is liable to strain the core chips partially because of the thinness of the core chips to be laminated together, thus seriously decreasing the yield of laminated magnetic core products . (2) Laminating the punched core chips one by one requires so much time and labor that it is a major obstacle to enhancement in productivity and cost reduction in the manufacture of magnetic heads and other products.

In order to overcome these shortcomings, the present inventor proposed punching out core chips at a stroke from a stack of a given number of laminated thin sheets of Permalloy or the like and then magnetically annealing the resulting laminated core chip blocks. Specifically, the inventor proposed to preliminarily laminate core thin sheets with the use of an adhesive of sodium silicate (water glass) prior to punching operation. This method has proved effective but showed that it causes serious problems when the laminated magnetic cores are produced in a mass production as follows.

The sodium silicate adhesive, after drying following painting for the lamination of core-forming thin sheets, would become very hard and lose its elasticity. The bonded laminate stacks thus obtained, therefore, become weaker to bending stress. For this reason, a bonded laminate stack should be fed into a punching press to be used for punching core chips in the form of a limited length. This presented a press producivity problem in the case of mass production.

Thus, it is concluded that the above proposed method is not suitable to mass production which preliminarily laminate core-forming thin sheets with the use of an adhesive of sodium silicate prior to punching operation.

OBJECT OF THE INVENTION

From the view point of enhanced press productivity, the material to be press-worked must be fed from a coil of a long, continuous strip which calls for a bonded laminate capable of withstanding the bending stress involved. In addition, the bonded laminate is required to stand the punching by a press, resist delamination after the magnetic annealing and exhibit excellent magnetic characteristics.

The present invention is aimed at the provision of a novel magnetic core article and its manufacturing method by which the above problems are eliminated.

SUMMARY OF THE INVENTION

After intensive research conducted in view of the foregoing, the present inventor has now created a laminated core production technique which attains increased bonding strength at the time of lamination, permits the feed in the form of a coiled laminate, permits to be satisfactorily punched out by a press, and undergoes no delamination after magnetic annealing.

Thus, the present invention provides a laminated magnetic core characterized in that core-forming thin sheets each having a surface roughness such that the maximum height Rmax is at least 1 μm are laminated together with a sheet-to-sheet distance of 2 to 10 μm while diffusion-bonding at least a part of protruded portions of the facing roughed surfaces to each other between adjacent thin sheets. The sheet-to-sheet distance is preferably 3 to 6μm. Desirably, innumberable voids are present at the diffusion-bonded interface between the adjacent thin sheets.

The present invention also provides a method of manufacturing a laminated magnetic core comprising the steps of providing a plurality of core-forming thin sheets each having a surface roughness such that the maximum height Rmax is at least 1 μm; laminating and bonding said core-forming thin sheets one upon another through an organic adhesive; punching out a block of a given shape from said laminated and bonded core-forming sheets by a press; and thereafter magnetically annealing the block while decomposing and vaporizing said organic adhesive to effect diffusion-bonding at the interface between adjacent thin sheets of the block. In a desired manner, the present invention provides a method of manufacturing a laminated magnetic core comprising the steps of providing a plurality of core-forming thin sheets each having a surface roughness such that the maximum height Rmax is at least 1μm; laminating and bonding said core-forming thin sheets one upon another at a sheet-to-sheet distance of 2 to 10 μm through an organic adhesive; punching out a block of a given shape from said laminated and bonded core-forming sheets by a press; and thereafter magnetically annealing the block while decomposing and vaporizing said organic adhesive to partially diffusion-bond protruded portions of the roughed surfaces between adjacent thin sheets of the block while lefting innumberable voids at the interface.

Preferably, the core-forming thin sheets are laminated with a sheet-to-sheet distance of 3 to 6 μm using an organic adhesive. The surface roughness may be adjusted such that the maximum height Rmax is at least 1 μm with the use of a dull-finish roll.

DETAILED DESCRIPTION OF THE INVENTION

The present invention will be better understood from the following detailed explanation.

First, in order to provide the resistance to bending stress and permit coiling of the laminated core-forming thin sheets, an organic adhesive for metal bonding as an adhesive at the time of laminating is used which exhibits a stronger adhesion. The organic adhesives for metal bonding employable is, for example, an epoxy resin, phenol resin, synthetic rubber, emulsion type polyvinylacetate, acrylic cyanoacrylate, or silicone rubber resin. Among them, the epoxy resin, synthetic rubber or acrylic cyanoacrylate is desirably used which is particularly excellent in the adheshion strength to metals and have better resistance to bending stress and press punching operation. However, such an organic adheshive has a shortcoming of inadequate heat resistance and decomposes on magnetic annealing, thereby causing delamination of the laminated core-forming thin sheets.

Figure 1:
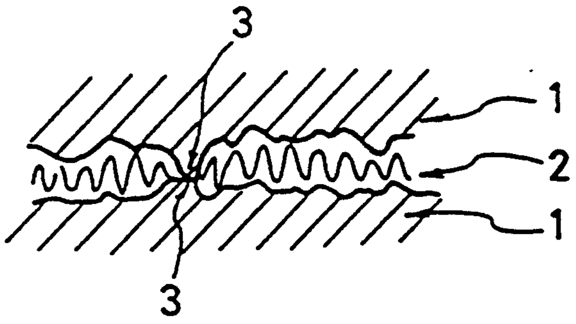
FIG. 1 is a schematic view, in cross section, of a fragment of laminated thin sheet block before being magnetically annealed to form a laminated magnetic core in accordance with the present invention.
Figure 2:
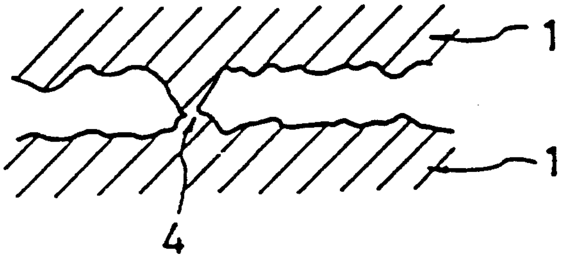
FIG. 2 is a schematic view, in cross section, of a fragment of laminated and diffusion-bonded thin sheet block after being magnetically annealed to form a laminated core in accordance with the present invention.

So, according to the present invention, the delamination after magnetic annealing is prevented by roughening the surface of the core-forming sheets with the use of dull-finish rolling, for example. Specifically, as illustrated in FIGS. 1 and 2, when the core-forming sheets 1 each having a roughened surface are laminated through an adhesive 2, some of the protruded portions 3 on the roughened surfaces facing each other are caused to pass through the adhesive layer and come in contact with each other. When the magnetic annealing is effected, these contact portions of the protruded portions on the opposite roughened surfaces are firmly bonded through diffusion. The bonds 4 thus formed effectivly prevents the delamination of the sheets even after the adheshive is vaporized off.

As the result, at the interface between adjacent core-forming sheets, innumberable voids are left which favorably maintain the insulation between the sheet layers.

These effects or advantages may be produced with a surface roughness having a maximum height, Rmax, of at least 1μm. The term maximum height is used herein according to the following definition: The maximum height, when a sampled portion has been interposed between the two parallel straight lines with a mean line of which length corresponds to the reference length that has been sampled from the profile shall be the value, expressed in micrometer(μm) measuring the spacing of these two straight lines in the direction of vertical magnification of the profile.

The upper limit of Rmax is not specifically limited, but an Rmax of 5 μm or less is desirable, since an Rmax exceeding 5 μm makes it difficult to control the accuracy of thickness of a resulting laminate.

Core-forming sheets are laminated with a sheet-to-sheet distance in the range of 2 to 10 μm, preferably of 3 to 10 μm. Under the sheet-to-sheet distance of the above range, the protruded portions on roughened surfaces facing each other are moderately and favorably bonded.

The core-forming sheet material to be used includes Permalloy, silicon steel, amorphous metal or the like.

This invention is illustrated by the following examples.

EXAMPLES

As magnetic head core material, PC Parmalloy 81% Ni-4% Mo-Fe was used which had been used as a head core Permalloy. It was subjected to final cold rolling to form thin sheets, 0.097 mm thick, with varied surface roughness values.

Next, six layers of each sheet were laminated through an epoxy adheshive for metal bonding. The total thickness of the laminate was controlled to be 0.6 mm±± 0.02 mm.

As comparative examples, six ply laminates of the same PC sheets were made using sodium silicate instead.

To determine whether these laminated sheets may be coiled or not, they were wound up around and set thereon a spool having 500 mm diameter. The sheets laminated through the epoxy resin adheshive in accordance with the present invention were allowed to stand at room temperature and the laminated sheets of the comparative examples were allowed to stand at 85° C, each for a time period of 24 hours. The laminated sheets were then fed to a press for punching core chip blocks of a given shape therefrom. The laminated sheets of the comparative examples made by the use of sodium silicate could not endure the bending stress imposed and were delaminated when the laminated sheets dried and set around and on the spool is fed to a press, they were subjected to a stress, since they are forcibly flattened.).

The laminated sheets that used the epoxy adhesive in accordance with this invention did not present the delamination and core chip blocks could be punched out therefrom.

Next, laminated blocks thus punched by a press were degreased with acetone and magnetically annealed in hydrogen at 1100° C. for 4 hours.

Following the magnetic annealing the laminated blocks were inspected as to whether delamination is occured and the laminated blocks free from delamination were incorporated into a magnetic head and tested for their magnetic characteristics. The results are given in Table 1.

TABLE 1

| Example No. | Rmax μ m | Delamination | Impedance (80 kHz) |
|---|---|---|---|
| | This invention: | | |
| 1 | 1.5 | No | 28 kΩ |
| 2 | 2.3 | No | 27 kΩ |
| 3 | 3.7 | No | 27 kΩ |
| | Comparative: | | |
| 4 | 0.8 | Yes | — |
| 5 | Conventional Process (laminated after annealing ) | | 30 kΩ |

As can be seen from Table 1, Examples according to this invention underwent no lamination after magnetic annealing. Their magnetic characteristics which were evaluated as impedance at 80 kHz pose no problem for practical purposes, although their values were only slightly lower than that of one according to conventional process. The reason of the slight inferiority is that the layer-to-layer insulation is somewhat worsened due to the presence of contacted and bonded portions formed by diffusion at the interface between the layers.

ADVANTAGES OF THE INVENTION

This invention has excellent advantages that greatly enhances the productivity in the manufacture of laminated cores for magnetic heads, transformers and the like without lowering their magnetic characteristics. With these excellent advantages this invention is expected to contribute largely to further progress in the field of electronic devices and components.

What is claimed is:

1. A method of manufacturing a laminated magnetic core comprising the steps of providing a plurality of core-forming thin metal sheets, each having protruded portions along both sides thereof defining a maximum height Rmax of at least 1 μm; laminating and bonding said core-forming thin sheets one upon another through a cured metal bonding organic adhesive to create an interface between adjacent sheets, said cured adhesive fixedly bonded to each of the adjacent sheets; punching out a block of a given shape from said laminated and bonded core-forming sheets by a press; and thereafter magnetically annealing the block, while decomposing and vaporizing said organic adhesive to effect diffusion-bonding at the interface between adjacent thin sheets of the block.

2. The method of manufacturing a magnetic laminated core as described in claim 1 wherein the core-forming thin sheets are laminated with a sheet-to-sheet distance of 3 to 6 μm using the organic adhesive.

3. The method of manufacturing a magnetic laminated core as described in claim 1 wherein the protruded portions are formed using a dull-finish roll.

4. The method of manufacturing a magnetic laminated core as described in claim 1 wherein the metal bonding adhesive is selected from the group of an epoxy resin, phenol resin, synthetic rubber, emulsion type polyvinylacetate, acrylic cyanoacrylate and silicone rubber resin.

5. A method of manufacturing a laminated magnetic core comprising the steps of providing a plurality of core-forming thin metal sheets each having protruded portions along both sides thereof defining a maximum height Rmax of at least 1 μm; laminating and bonding said core-forming thin sheets one upon another to create an interface between adjacent sheets at a sheet-to-sheet distance of 2 to 10 μm through a metal bonding organic adhesive, said adhesive fixedly bonding to each of the adjacent sheets; punching out a block of a given shape from said laminated and bonded core-forming sheets by a press; and thereafter magnetically annealing the block while decomposing and vaporizing said organic adhesive to partially diffusion-bond the protruded portions to each other between adjacent thin sheets of the block while leaving innumerable voids at the interface between adjacent sheets of the block to create an insulating air gap.

* * * * *

UNITED STATES PATENT AND TRADEMARK OFFICE
CERTIFICATE OF CORRECTION

PATENT NO. : 5,312,503

DATED : May 17, 1994

INVENTOR(S) : YUKI

It is certified that error appears in the above-identified patent and that said Letters Patent is hereby corrected as shown below:

On the title page, item [73]: replace "Assignee: Nippon Mining Co, Ltd., Tokyo, Japan" with -- Assignee: Nippon Mining & Metals Co., Ltd., Tokyo, Japan --

Signed and Sealed this

Twenty-fifth Day of October, 1994

Attest:

BRUCE LEHMAN

*Attesting Officer*

*Commissioner of Patents and Trademarks*